UNITED STATES PATENT OFFICE.

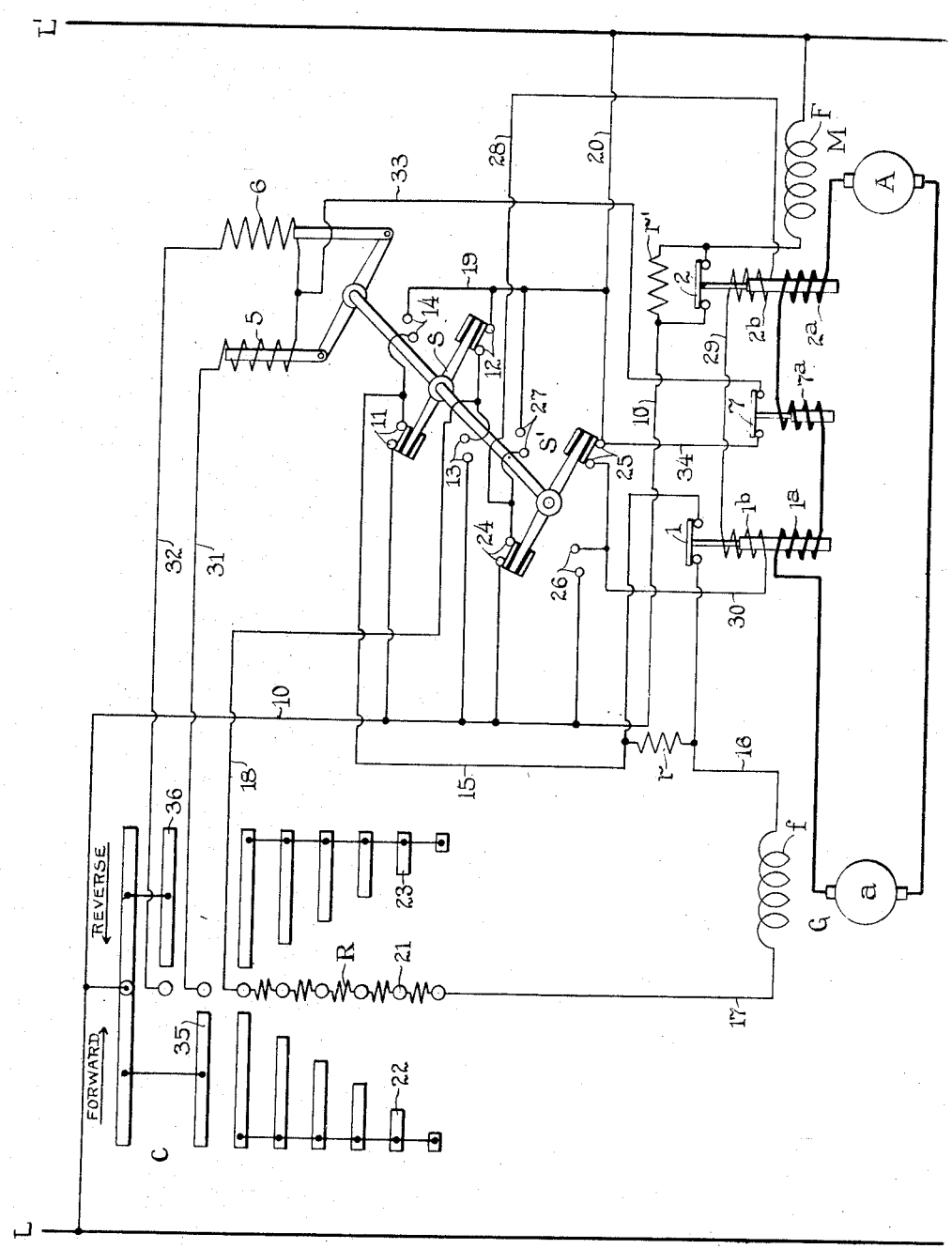

WALTER C. KENNEDY, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROL SYSTEM.

1,282,855.

Specification of Letters Patent.

Patented Oct. 29, 1918.

Application filed March 7, 1916. Serial No. 82,561.

*To all whom it may concern:*

Be it known that I, WALTER C. KENNEDY, a citizen of the United States, residing at Milwaukee, in the county of Milwaukee and State of Wisconsin, have invented new and useful Improvements in Motor-Control Systems, of which the following is a full, clear, concise, and exact description, reference being had to the accompanying drawing, forming a part of this specification.

This invention relates to improvements in motor control systems.

The invention is particularly applicable to systems wherein the controlled motor is supplied with power from a generator and is governed by regulation of the field of said generator, although certain features of the invention may be advantageously used in other relations.

One of the objects of the invention is to provide simplified means responsive to current variations in the motor circuit for selectively regulating the field of the generator and the field of the motor in accordance with the action of the motor, *i. e.*, as a motor or as a generator.

A further object is to provide simplified means to protect the system against too quick reversals of the generator polarity.

Other objects and advantages of the invention will hereinafter appear.

The accompanying drawing illustrates one embodiment of the invention which will now be described, it being understood that the invention may be embodied in other forms falling within the scope of the appended claims.

Referring to the drawing, the controlled motor M is shown as of the shunt type, being provided with an armature A and a shunt field winding F. It is supplied by a generator G having an armature $a$ and a shunt field winding $f$. The field of the generator is reversible to reverse the flow of current through the armature of motor M and is provided with a variable resistance R by means of which the generator output, and in consequence the power supplied to motor M, may be varied. A master controller C, schematically shown as of the drum type, is provided to control the resistance R and also the polarity of the generator field, the latter through an electro-magnetically controlled reversing switch S. Further, a resistance $r$ is also included in the field circuit of the generator to be controlled by an electro-responsive relay 1 and a resistance $r'$ is included in circuit with the field of the motor to be controlled by an electro-responsive relay 2.

Both relays 1 and 2 normally short-circuit their respective resistances and each is provided with two windings. Relay 1 has a winding $1^a$ in series with the motor and a shunt winding $1^b$, while relay 2 has a winding $2^a$ in series with the motor and a shunt winding $2^b$, both of said shunt windings, as will hereinafter appear, being connected across the line. Thus it will be apparent that the polarity of the windings $1^a$ and $2^a$ will be reversed with reversals of the current in the motor circuit while windings $1^b$ and $2^b$ will be independent of such current reversals. The windings $1^b$ and $2^b$ are, however, subject to reversals of polarity as will hereinafter appear and when energized one of these windings will always oppose its respective series winding while the other will act cumulatively with its respective series winding.

As will be understood, the resistance $r$ and its relay 1 are provided for regulating the generator field upon predetermined current variations when the machine M is acting as a motor, while the resistance $r'$ and its relay are provided to regulate the field of machine M upon predetermined current variations when said machine is acting as a generator. Also, as will be understood, it is desired to insure inaction of each relay during action of the other and it will be readily apparent that the very simple relays described provide for this result. For example, if current is supplied clockwise through the loop including the two machines and the winding $1^b$ is polarized to act cumulatively with the winding $1^a$, the winding $2^b$ will, as above stated, oppose winding $2^a$. The windings $2^a$ and $2^b$ being thus opposed to one another the relay 2 will be rendered inert while the relay 1 will, through the cumulative action of its windings, be rendered sensitive to current variations and will at predetermined current values vibrate to open and close the short circuit around resistance $r$, with the well-known result. On the other hand, if the machine M should now act as a generator it would effect a reversal of the flow of current through windings $2^a$ and $1^a$ with the result of placing windings $1^a$ and $1^b$ in opposed relation and windings 2ᵃ and 2ᵇ in cumulative relation. This in turn would render relay 1 inactive and relay 2 active to vibrate at predetermined current values to open and close the short-circuit around resistance $r'$ with the well known result. As will be understood the windings 1ᵇ and 2ᵇ are in no wise affected by the reversals of current in the motor circuit, and during the cycle of operation described the polarity thereof would remain unchanged. It therefore obviously follows that the same regulation by the relays 1 and 2 may be obtained upon reversal of the polarity of the generator and hence a counter-clockwise flow of current through the motor, by mere reversal of the polarity of each of windings 1ᵇ and 2ᵇ.

As shown, a switch S' is provided to effect reversals of the polarity of windings 1ᵇ and 2ᵇ and this switch is coupled with and operable by the generator reversing switch S to insure polarization of said windings according to the polarization of the generator field. Hence the proper relation of the relay windings for reverse operations of the motor, is insured.

The reversing switches S and S' are each arranged to stand in either of two positions and are adapted to be moved to said positions selectively by electromagnetic windings 5 and 6 in turn adapted to be selectively energized by the master controller C. The master controller, however, only energizes windings 5 and 6 subject to the action of an electro-responsive relay 7 in circuit with both of said windings. This relay is normally closed and has an operating winding 7ᵃ in series with the motor M.

The relay 7 functions to insure against too quick reversals of the generator. It is set to respond at a comparatively low current value and to remain energized so long as the current in the motor circuit exceeds such a value as to render reversal of the generator undesirable. In responding relay 7 interrupts the circuits of both windings of the reversing switch and in consequence obviously insures against energization of either winding so long as the current in the motor circuit exceeds the aforesaid critical value.

Referring now to the connections illustrated, the armatures of the motor and generator and the windings 1ᵃ, 7ᵃ and 2ᵃ of the three relays described are all connected in a closed loop, while the field of the motor is connected through resistance $r'$ across lines L and L'. The motor field is connected directly to line L' and to resistance $r'$ while said resistance is connected by conductor 10 to line L.

The generator field has two circuits. One circuit extends from line L by conductor 10 through contacts 11 of reversing switch S, by conductor 15 through resistance $r$ or relay 1, by conductor 16 through the field winding from right to left, by conductor 17 through resistance R, by conductor 18 through contacts 12 of reversing switch S to conductor 19 and thence by conductor 20 to line L'. The other circuit extends from line L by conductor 10 through contacts 13 of the reversing switch to and by conductor 18 through resistance R, by conductor 17 through the field winding from left to right, thereby reversing the polarity of said winding, by conductor 16 through resistance $r$ or relay 1, by conductor 15 through contacts 14 of the reversing switch, by conductors 19 and 20 to line L'. In off position of the controller C the resistance R is included in circuit with the generator field and said controller has a set of contact fingers 21 and two sets of coöperating segments 22 and 23 to exclude said resistance in steps upon forward and reverse operations of the controller respectively.

With the switch S' in the position illustrated, circuit is closed through windings 1ᵇ and 2ᵇ as follows: From line L by conductor 10 through contacts 24 of switch S', by conductor 28 through winding 2ᵇ, by conductor 29 through winding 1ᵇ, by conductor 30 through contacts 25 of switch S', to conductor 20 and thence to line L'. These windings are thus connected in series with current flowing therethrough from right to left. When the switch S' is thrown to its other position circuit is closed from line L by conductor 10 through contacts 26 of said switch, by conductor 30 through the windings 1ᵇ and 2ᵇ from left to right, by conductor 28 through contacts 27 of switch S', by conductors 19 and 20 to line L'. These circuits thus provide for reversal of the polarity of windings 1ᵇ and 2ᵇ as above described.

Finally the circuits of windings 5 and 6 of reversing switches S and S' are as follows: The upper terminals of the windings 5 and 6 are respectively connected by conductors 31 and 32 to separate contacts of the controller C while the opposite terminals of said windings are connected to a common conductor 33 which provide a circuit therefrom to and through relay switch 7, by conductor 34 to conductor 20 and thence to line L'. The contact arrangement of the controller C to selectively complete the circuits of windings 5 and 6 is so obvious as to require no specific description. The controller has a connection to line L and when moved in forward direction its coöperating contacts 35 complete circuit of winding 5 while upon reverse operation of the controller its coöperating contacts 36 complete the circuit of winding 6 and in off position said contacts open the circuits of both windings.

As above stated, certain features of the invention may be advantageously used in other relations and the invention may be embodied in other forms without departing from the scope of the appended claims.

What I claim as new and desire to secure by Letters Patent is:

1. In a motor control system, in combination, a motor, a generator for supplying power to said motor, an electro-responsive regulator for said generator responsive to variations of current in the circuit between said generator and said motor, an electro-responsive regulator for said motor responsive to variations of current in the same circuit, and means independent of said circuit for rendering said regulators dependent for response upon reverse currents in said circuit.

2. In a motor control system, in combination, a motor, a generator, a supply circuit from the latter to the former, a regulator for said generator, a regulator for said motor, each of said regulators having an operating winding connected in said circuit in series with said motor and electro-responsive means independent of said circuit to insure against response of said devices except to reverse currents in said circuit.

3. In a motor control system, in combination, a motor, a generator, a supply circuit from the latter to the former, a regulator for said generator, a regulator for said motor, both of said regulators having operating windings connected in said circuit in series with said motor, and means independent of said circuit to restrict response of the former regulator to current supplied from said generator and response of the latter regulator to current supplied from said motor when acting as a generator, regardless of reversals in the flow of current from said generator to said motor.

4. In a motor control system, in combination, a motor, a generator, a supply circuit from the latter to the former, a regulator for said generator, a regulator for said motor, each of said regulators having an operating winding connected in said circuit in series with said motor and means independent of said circuit for restricting response of said regulators to reverse currents in said circuit, said means being variable in effect to compensate for reversals in the flow of current from said generator to said motor.

5. In a motor control system, in combination, a motor, a plurality of regulators each having an operating winding in series with said motor, and means independent of the motor circuit to restrict response of said regulators to reverse currents for operation of one upon current supplied to said motor and operation of the other upon current supplied by said motor.

6. In a motor control system, in combination, a motor, a plurality of regulators each having an operating winding in series with said motor, and means independent of the motor circuit to restrict response of said regulators to reverse currents for operation of one upon current supplied to said motor and operation of the other upon current supplied by said motor, said means being variable in effect to preserve the aforesaid relation between said regulators and said motor upon reversals of said motor.

7. In a system of control for electric motors, in combination, a motor, a plurality of regulators each having a control winding in series with said motor and an auxiliary winding independent of the motor circuit, the windings of each regulator acting cumulatively or in opposition according to the direction of flow of current through the series winding and in reverse relation with respect to the windings of another relay and means to effect reversal of the polarity of the auxiliary winding of each of said regulators upon reversal of said motor.

8. In a controller for a motor, in combination, a motor having a shunt field winding, a regulator for the shunt field circuit of said motor, said regulator having a winding in series with the armature of said motor and an auxiliary winding independent of the motor circuit to assist or oppose said former winding according to the direction of flow of current through said former winding and means to effect reversal of the polarity of said auxiliary winding upon reversal of said motor.

9. In a motor control system, in combination, a motor, a generator, a supply circuit from the latter to the former, means for reversing the polarity of the field of said generator for reversing the supply of current to said motor, and means having a control winding in series between said generator and said motor to govern said former means for insuring against reversal of the polarity of the field of said generator except under predetermined current conditions of said circuit.

10. In a control system, in combination, a motor, a generator, a supply circuit from the latter to the former, electro-responsive means to reverse the polarity of the field of said generator for reversal of said motor, a master controller for directing operation of said means and an electro-responsive switch responsive to the current in said circuit to render said master controller ineffective with respect to said reversing means while the current in said circuit exceeds a critical value.

In witness whereof, I have hereunto subscribed my name.

WALTER C. KENNEDY.